(12) United States Patent
Lu (10) Patent No.: US 10,929,639 B2
(45) Date of Patent: Feb. 23, 2021

(54) METHOD AND SYSTEM FOR ENCODING FINGERPRINT OF THINGS

(71) Applicant: FOT Tech (Shanghai) Co., Ltd, Shanghai (CN)

(72) Inventor: Jiwen Lu, Shanghai (CN)

(73) Assignee: FOT Tech (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 16/475,372

(22) PCT Filed: Dec. 14, 2017

(86) PCT No.: PCT/CN2017/116212
§ 371 (c)(1),
(2) Date: Jul. 1, 2019

(87) PCT Pub. No.: WO2018/126866
PCT Pub. Date: Jul. 12, 2018

(65) Prior Publication Data
US 2019/0340411 A1 Nov. 7, 2019

(30) Foreign Application Priority Data
Jan. 4, 2017 (CN) .......................... 2017 1 0003305

(51) Int. Cl.
*G06K 9/00* (2006.01)
*G06K 9/32* (2006.01)
(Continued)

(52) U.S. Cl.
CPC ..... *G06K 9/00073* (2013.01); *G06K 9/00093* (2013.01); *G06K 9/3208* (2013.01); *G06K 9/4642* (2013.01); *G06K 9/6202* (2013.01)

(58) Field of Classification Search
None
See application file for complete search history.

(56) References Cited

U.S. PATENT DOCUMENTS 5,631,971 A * 5/1997 Sparrow .................. G07C 9/37
382/125
10,503,957 B2 * 12/2019 Suwald .............. G06K 9/00073
(Continued)

OTHER PUBLICATIONS

Mohammed Fadhil Ibrahim, A Method to Encode the Fingerprint Minutiae Using QR Code, 2017, the Journal of the College of Basic Education, vol. 23 Issue: 99, pp. 17-28 (Year: 2017).*

*Primary Examiner* — Joseph R Haley
(74) *Attorney, Agent, or Firm* — HDC IP Law, LLP (57) ABSTRACT

An encoding method and system for a fingerprint of thing according to the present application is disclosed. Based on images of human fingerprints, at least one characteristic of fingerprint is provided on at least friction ridge lines so as to enable the encodement in the form of numbers and/or alphabets, and thereby a fingerprint image including the specific information are formed and can be used for labelling products with codes. The fingerprint image includes the specific information of a thing, and when attached onto said thing, is also unique similar to a fingerprint of an individual. Such fingerprint image for representing the specific identification information of a thing using minutia of finger can be referred to as fingerprint of thing (FOT). The fingerprint of thing, as a wholly new two-dimensional code which is generated based on images of human fingerprints, includes the more information than that of a one-dimensional barcode, and can be used for represent the information which cannot be represented by a one-dimensional barcode and will be too complicated for a two-dimensional barcode to represent. With an encoding method and system according to the present application, a fingerprint of thing including the unique identification information can be printed or carved onto every product, and can keep unchanged similar to a human fingerprint and can be readily used for query.

18 Claims, 7 Drawing Sheets

(51) Int. Cl.
*G06K 9/46* (2006.01)
*G06K 9/62* (2006.01)

(56) References Cited

U.S. PATENT DOCUMENTS

2017/0076138 A1* 3/2017 Bartels ............. G06K 19/06009
2019/0251379 A1* 8/2019 Bawolek .......... G06K 19/06028

* cited by examiner

| Type of Minutia | Pattern |
|---|---|
| Ending |  |
| Bifurcation |  |
| Enclosure |  |
| Bridge |  |
| Short ridge |  |
| Crossover |  |
| Dot |  |
| Break |  |

| Pattern | Number | Pattern | Alphabet |
|---|---|---|---|
| ≡ | 0 | ═•═ | A |
| — — | 1 | ═•═ | B |
| ⇋ | 2 | ═•═ | C |
| ⇌ | 3 | ═•═ | D |
| — | 4 | | |
| — | 5 | | |
| ⇁ | 6 | | |
| ⇀ | 7 | | |
| ⇌ | 8 | | |
| ⊨ | 9 | | |

METHOD AND SYSTEM FOR ENCODING FINGERPRINT OF THINGS

TECHNICAL FIELD

The application relates to the field of encoding technology, and in particular, an encoding method and system for a fingerprint of thing based on minutia of fingerprint.

BACKGROUND

With the boom of economy, numerous products have been manufactured, and the classification, identification, trace, and verification of the goods are necessary. The one-dimensional barcode became known in the United States of America in the year of 1949, and the two-dimensional barcode in a format referred to as PDF417 was invented at the Symbol Technologies of the United States of America in the year of 1991, ever since which respective wide applications of the one-dimensional barcode and the two-dimensional barcode have been seen in various fields. The one-dimensional barcode contains a limited amount information while the two-dimensional barcode contains a huge amount of information. Images of both barcodes usually appear in the shape of bar or square, which are obviously different from respective goods that they correspond to. The one-dimensional bar and two-dimensional bar have been put into use on a wide scale in corresponding industries depending on their respective properties, have turned into a part of daily lives, and especially in the era of mobile internet, have become vital for daily life.

Notwithstanding, a barcode contains a limited amount information, and hence, in practice, itself is usually used as an identifier with the support by external database. In contrast, a two-dimensional barcode having a barcode format which is more sophisticated than that a one-dimensional barcode has is capable of representing the information both in the horizontal orientation and in the vertical orientation and thereby can represent a huge amount of information in a relatively small area of image. The two-dimensional barcode is of a high reliability and thus gains a widespread popularity. However, problems in practice of two-dimensional barcodes such as many frauds in connection with two-dimensional barcodes results in a barrier to a more widespread popularity.

It is well known that a human fingerprint is defined by a distinct pattern and specifically a pattern of friction ridges lines on the skin of finger of an individual. Minutiae points are defined as, for example, starting points, ending points, bifurcation points, and joint points of the friction ridge lines. Numerous combinations of minutiae points of friction ridge lines exist, and therefore each fingerprint or even each friction ridge line of a fingerprint are distinct. Biological features of fingerprint can be classified into general features and local features.

A description of the general features of human fingerprint will be presented as follows.

Raised portions of fingertip skin form friction ridges, the friction ridges appear as almost-parallel curved lines, and are classified into various types of fingerprints which are referred to as general features of fingerprint. Fingerprints can be classified, depending on patterns thereof, into three major types, which are arch, loop, and whorl. Actually, types of human fingerprints are not limited to those three types.

(1) Arch

As an arch pattern, friction ridge lines flow in from one side and out from the other side of finger with protuberance in the middle. In an arch pattern, an actual core point does not exist, lines at the center and surrounding lines do not have explicit boundaries, and thus no genuine triangular curves can be seen. Said core point refers to a characteristic (one of minutia) in a fingerprint image as geometrical characters of which the angular variation of the friction ridge line about the core point C is $\pi$ and that about two core points is $2\pi$.

(2) Loop

As a loop pattern, friction ridge lines flow in from one side and out from the same one side of finger with backward turn in the middle. One or more complete loops can constitute a core pattern (core point). In a loop pattern, a triangular pattern (delta point) formed by upper friction ridge lines and lower friction ridge lines surrounds the core pattern.

(3) Whorl

As a whorl pattern, a core pattern appears as such curves as circular curves or spiral curves which spread from inside to outside and join upper surrounding friction ridge lines and lower surrounding friction ridge lines so as to form two or more delta points.

A description of the local features of human fingerprint will be given as follows.

The local features can also be referred to as characteristics or minutia. Actually, friction ridge lines of fingerprint are not always continuous and smooth but usually have breaks, bifurcations or turns. The breaks, bifurcations and turns are minutia. Two fingerprints have the same general features, and however respective local features, i.e., minutia, of the two fingerprints cannot be completely the same to each other. Therefore, minutia can provide the information for supporting the uniqueness of fingerprint.

The local features can be described in natures including classification, position, orientation, curvature and so on.

As to the classification, the most typically, the local features can be classified into endings and bifurcations.

Figure 1:
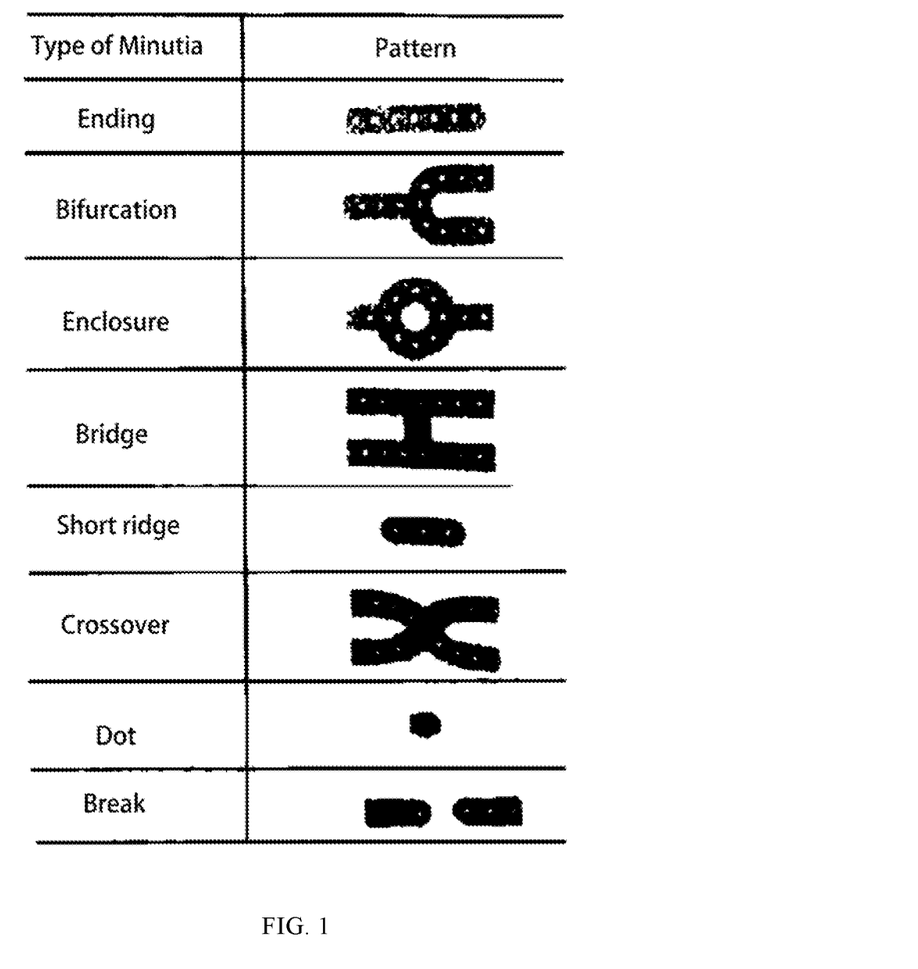
FIG. 1 illustrates a schematic diagram for the classification of local features in the prior art.

A schematic diagram for the classification of local features in the prior art is illustrated in FIG. 1, in which, 1. Ending refers to either a starting point or a terminating point of a friction ridge line;

2. Bifurcation refers to a point where a single friction ridge line divides into two friction ridge lines;

3. Enclosure refers a characteristic in which a single friction ridge line that bifurcates and rejoins after a short course and continues as a single friction ridge;

4. Bridge refers to a characteristic in which a friction ridge line connecting two neighboring friction ridge lines;

5. Short ridge refers to a friction ridge line of small length positioned between two bifurcations;

6. Crossover refers to a point where two friction ridge lines cross;

7. Dot refers to an isolated dotted friction ridge line;

8. Break refers to a pair of endings formed due to the break of friction ridge line.

Figure 2:
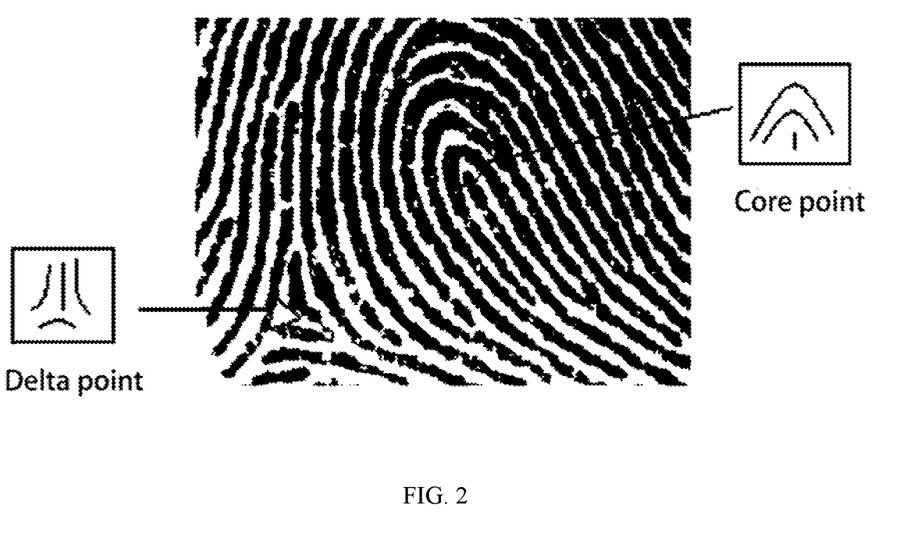
FIG. 2 illustrates a schematic diagram for a core point and a delta point of a fingerprint in the prior art.

A schematic diagram for a core point and a delta point of a fingerprint in the prior art is illustrated in FIG. 2. As shown in FIG. 2, a core point and a delta point can be defined on friction ridge lines and can be referred to as singular points.

A core point is located at the asymptotic center of friction ridge line, and can be used as a reference point when a fingerprint is scanned.

A delta point is located at the first bifurcation or break from a core point, a position where two friction ridge lines converge, a dot, or a turn-back, or is pointed at those singular points.

As to the nature of position, a position of a local feature can be described in a two-dimensional coordinate system using either absolute coordinates or relative coordinates, or as shown in FIG. 2, can be described in relation to a delta point or a core point.

As to the nature of orientation, an orientation of a local feature refers to an orientation of a friction ridge line where the local feature is located in.

As to the nature of curvature, a curvature refers to a rate of change in orientation of friction ridge line, and specifically, a rate of variation of an orientation of a friction ridge line at a point relative to that at its precedent.

Human fingerprints, as a unique biological character of an individual, can usually be used for identifying and distinguishing human bodies. In the prior art, a lot of methods for encoding the information on images of fingerprints, and by these methods, the information on images can be encoded so as to recognize the information on images and be compared with the information on already-available images of fingerprints.

As an example, the Chinese Patent Application with Publication No. of CN104376307A (and Publication Date of Feb. 25, 2015) disclosed a method for encoding the information on image of fingerprint. Specifically, in the method, a skeletal image of fingerprint after preprocessed as well as the type of fingerprint, core points, delta points, bifurcations and endings of fingerprint which have been extracted are input and then are subject to an encoding process, so as to obtain a stable code of a certain length to which the image of fingerprint corresponds. The encoding process comprises the following major steps: (S1) registration: a registration of the image is performed for five types of fingerprints according to the following: for a fingerprint of whorl having two core points, using the upper core point as an origin O of the image, and performing rotation such that a line connecting the two core points becomes a vertical line of the image; for fingerprints of left loop, right loop, and tented arch each of which has a core point and a delta point, using the core point as an origin O of the image, and performing rotation such that a line connection the core point with the delta point becomes a vertical line of the image; for a fingerprint of arch, performing rotation such that a vertical line of arch becomes a vertical line of the image, and using a point on the vertical line of the image located at the middle between a horizontal friction ridge line and the first friction ridge line above it as an origin O of the image; (S2) partitioning: partitioning the skeletal image of fingerprint after registration, specifically, into a series of square areas outward from the origin as a center with spacing of three pixels, which square areas are image areas of Number 1, Number 2, Number 3 and so on, until the edge of the image; (S3) numbering minutia: numbering minutia in a sequence of natural number, and specifically, numbering the origin O as Number 1 with numbers for minutia in inner areas being smaller those in outer areas, and, in the same one area, from the right side of the horizontal axis about the origin and anti-clockwise, such that n minutia are numbered as P1, P2, . . . , Pn; (S4) encoding minutia: according to a length of code as required, selecting a certain number of, for example, n minutia in a sequence of increasing numbers; for a characteristic Px (Px=P3 for a first encoding) as a reference, encoding each characteristic posterior to Px according to the following: encoding each characteristic into an eight-digit code in which the first two digits (from left to right) stand for categories of minutia, and, for example, 00 stand for a core point, 01 for a delta point, 10 for a bifurcation, 11 for an ending, and the last six digits stand for the number of friction ridge lines across which a line connecting the each characteristic with Px runs; (S5) judging whether a further encoding is necessary: if yes, performing S6; if not, performing S7; (S6) taking a characteristic one posterior to the reference Px as a reference (i.e., taking P3 as a reference for the first encoding, and taking P4 as a reference for the second ending, and so on), and then performing S4, by which it can be seen at most n−3 encodings can be performed; (S7) connecting codes: connecting a code of each one characteristic in each encoding to another one in the next encoding so as to obtain a final code to which the image of finger.

Further, the Chinese Patent Application with Publication No. of CN104376307A involves an encoding method for extracting minutia from an image of finger as acquired so as to obtain the information including minutia of fingerprint so as to encoding the biological minutia information of human fingerprints such that keys in an cryptography solution can be generated to improve the safety and convenience of information system. Essentially, in the method, natural human fingerprints are read as objects for reading and then are encoded. In specific, only four minutia, i.e., a core point (00), a delta point (01), a bifurcation (10) and an ending (11), of minutia of fingerprint are taken into account, and a code is constituted by two digits standing for each of the four minutia and six digits for the number of friction ridge lines across which a line connecting the each characteristic with P3 runs, and can be expressed as, for example, Ser. No. 10000021. That is to say, a certain fingerprint is converted into a long string of certain digits. However, in an image of fingerprint, not only said four minutia but more minutia are included, and thus an image of fingerprint cannot be obtained by decoding the string of digits.

In the prior art, there is not any encoding scheme which requires an amount of information more than a one-dimensional barcode but less than a two-dimensional barcode, has a simpler and more concise image, is easily trustful, and is capable of enabling one code for one thing. Currently, as an example of taking advantage of human fingerprints, an image of fingerprint is read and then is encoded using minutia of fingerprint only for matching two fingerprint images. Up to now, there is not such an encoding scheme by which fingerprint images including the certain information can be generated by taking advantage of minutia of human fingerprints.

The present application provides an encoding method for, by use of minutia of finger, generating a new two-dimensional code different from the existing two-dimensional barcode, that is, fingerprint of thing (FOT) which can be used for indicating an identification of product. A fingerprint image generated by an encoding method for generating FOT includes the unique information of a thing, and when attached onto said thing, is also unique similar to a fingerprint of an individual.

SUMMARY

According to an aspect of the present application, an encoding method for a fingerprint of thing is disclosed. So-called fingerprint of thing (FOT) refers to such a fingerprint image including the specific information which is generated by providing at least one fingerprint characteristic on at least one friction ridge line based on at least one preset fingerprint templates so as to enable an encodement with codes in the form of numbers and/or alphabets. The fingerprint image as generated can be used for encoding and labeling products, and includes the unique information of a certain thing, and when attached onto said thing, is also unique similar to a fingerprint of an individual.

The encoding method comprises:

Step for defining minutia of fingerprint: associating the minutia of fingerprint with characters such as alphabets and/or numbers so as to form a database defining the encoding information of minutia of fingerprint;

Step for selecting template: selecting from a database of fingerprint templates a fingerprint template which is an image of fingerprint having a plurality of marking points;

Step for forming encoding sections: building a two-dimensional coordinate system, and based on the two-dimensional coordinates system, partitioning the fingerprint template into at least one encoding sections;

Step for forming encoding blocks: providing in the at least one encoding sections a plurality of rays with each ray extending from an origin of the two-dimensional coordinate system as a vertex and with an angle between every two neighboring rays, and forming a plurality of encoding blocks at intersections between the rays and corresponding friction ridge lines of the fingerprint template;

Step for forming codes: selecting encoding blocks to be encoded according to the encoding information to be encoded, and substituting each encoding block as selected with a pixel image of minutia of fingerprint, so as to form an image of fingerprint having the minutia of fingerprint including the encoding information.

At least one fingerprint templates are included in the database of fingerprint templates.

The marking points comprises one core point and two delta points provided fixed positions in the fingerprint template respectively or three specific minutia of fingerprint at fixed positions on peripheral friction ridge lines of the fingerprint template.

The core point is a starting point, a terminating point, or a dot of a spiral friction ridge line.

Lines connecting the core point and the two delta points form an isosceles triangle or an equilateral triangle.

The building of a two-dimensional coordinate system further comprises: setting the core point as an origin, taking a line connecting a middle point of a connecting line of the two delta points to the origin as Y Axis, and taking the connecting line of the two delta points after translated toward the core point as X Axis, so as to build a two-dimensional coordinate system.

For a fingerprint template without any delta points, the building of a two-dimensional coordinate system further comprises: setting the core point as an origin, rotating the image of fingerprint such that the three marking points are located on the top, at the bottom and on the left, respectively, taking a line connecting the core point with a marking point on the top as Y Axis, and taking a line connecting the core point to a marking point on the left as X Axis, so as to build a two-dimensional coordinate system.

The encoding sections are formed by partitioning the image of fingerprint according to angels and/or distances to the origin based on the two-dimensional coordinate system.

The encoding blocks are pixel areas formed about the intersections for substitution.

Any of the encoding blocks is in the shape of rectangle, square, or regular sector.

At least one friction ridge lines are included in any of the encoding blocks.

Two or three friction ridge lines are included in any of the encoding blocks.

The encoding blocks are the same as the corresponding pixel images of minutia of fingerprint in size.

The pixel images of minutia of fingerprint are pixel images comprising minutia of fingerprint including a core point, delta point, bifurcation, enclosure, bridge, crossover, break or dot.

The minutia of fingerprint can represent specific alphabets or numbers.

Codes representing the specific information are formed according to alphabets or numbers which the minutia of fingerprint formed on the image of fingerprint represent and coordinates or angles of the minutia of fingerprint.

Any of the encoding sections can be formed as a public section for storing a string of characters for the encoding information or an encrypting section for storing a key for the encoding information.

The key is a string of characters for describing a sequence for storing and/or reading the string of characters for the encoding information.

According to a further aspect of the present application, an encoding system for a fingerprint of thing for implementing the aforementioned encoding method is disclosed.

According to a further aspect of the present application, a label of fingerprint of thing comprising the image of fingerprint formed in the aforementioned encoding system is disclosed.

According to a further aspect of the present application, a computer program comprising computer program codes to be loaded into a computer system and to be executed for implementing the aforementioned encoding method is disclosed.

According to a further aspect of the present application, a computer-readable storage medium for storing the aforementioned computer program is disclosed.

The encoding method for a fingerprint of thing according to the present application has the following advantages and technical effects.

(1) Huge Amount of Information

For each fingerprint of thing having a surface area equivalent to a fingerprint on a fingertip, 72 encoding blocks (or referred to as encoding information bits) can be formed. The quantity of the encoding information bits of the fingerprint of thing is far larger than that of a one-dimension barcode. On the other hand, a substantive length is required for the one-dimensional barcode, while the surface area of the fingerprint of thing is rather small, which means that scanning devices for the fingerprint of thing can be small in size. For example, 4 encoding blocks can be formed on one ray, in which one key code, one check code and two valid codes can be provided, and thus in the whole fingerprint of thing, 18 rays can be provided with an angle between every two neighboring rays as 20°, by which 36 encoding blocks can be obtained and at least 36 characters can be represented.

(2) High Compatibility

For each encoding block of the fingerprint of thing, at least 7 types of codes are available. The codes are compatible with the one-dimensional barcode for providing the information on manufactures and categories of products and also can be used for generating a serial number for each product such that the code for each product can be unique so as to enable one code for one thing.

(3) Strengthened Identifiability

Friction ridges lines of fingerprint appear distinct and thus have strengthened identifiability in the information on characteristics. The fingerprint of thing can be labeled onto the surface of a product through either printing or carving. For example, the fingerprint of thing can be directly printed onto or carved on the surface of product, and thus become a part of the product and are insusceptible to duplication and damage.

(4) Improved Confidentiality

The encoding sections can be formed as a public section or an encrypting section. In the encrypting section, a sequence for storing and reading codes are associated with a string of characters (alphabets or numbers), which can be referred to as an encoding key. As such, strings of characters identical to each other which are read from the public section can be used for forming respective images of fingers representing different information based on different encoding keys. Therefore, fingerprints of things cannot be decoded correctly without corresponding keys.

(5) Great Tolerance

By the encoding method according the present application, one check code can be provided in several encoding blocks on the same one ray, and can be used for inferring values of data of a certain missing encoding block.

With the technical solutions according to the present application, through scanning fingerprints on goods using mobile phones or scanners and with the identifying software and cloud platform, the important information of the goods can be queried and retrieved quickly, which comprises names, manufacturers, serial numbers, production dates, query numbers and query locations and so on of the goods. Assuming that a fingerprint of thing of a certain product is completely duplicated, fingerprints of things labelled onto all of replicas of the product could be identical to each other. If two or more of the products are queried, it can be determined whether any of the queried products is a replica according to the retrieved identical serial numbers of product or the retrieved query number and location of the product. If the encoding key is not correct or is missing, the incorrect information of product will be indicated or the identification cannot be performed, and thus it can be determined whether the product is genuine or not.

DETAILED DESCRIPTION

Hereinafter, with reference to the appended drawings, a detailed description on embodiments of the present application will be presented.

An encoding method for fingerprint of thing comprises:

Step for defining minutia of fingerprint: associating the minutia of fingerprint with characters such as alphabets and/or numbers so as to form a database defining the encoding information of minutia of fingerprint;

Step for selecting template: selecting from a database of fingerprint templates a fingerprint template which is an image of fingerprint having a plurality of marking points;

Step for forming encoding sections: building a two-dimensional coordinate system, and based on the two-dimensional coordinates system, partitioning the fingerprint template into at least one encoding sections;

Step for forming encoding blocks: providing in the at least one encoding sections a plurality of rays with each ray extending from an origin of the two-dimensional coordinate system as a vertex and with an angle between every two neighboring rays, and forming a plurality of encoding blocks at intersections between the rays and corresponding friction ridge lines of the fingerprint template;

Step for forming codes: selecting encoding blocks to be encoded according to the encoding information to be encoded, and substituting each encoding block as selected with a pixel image of minutia of fingerprint, so as to form an image of fingerprint having the minutia of fingerprint including the encoding information.

Figure 4:
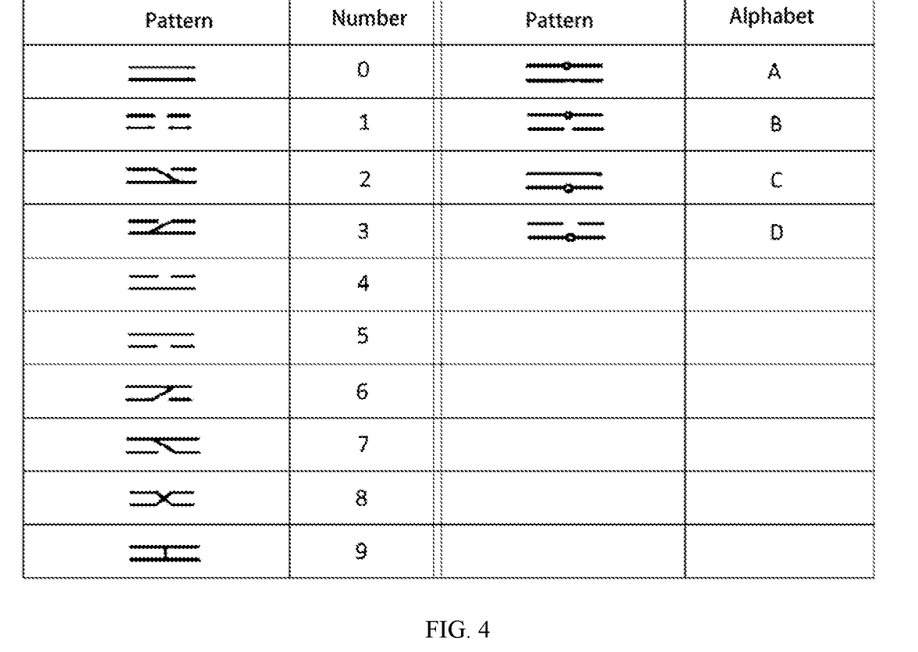
FIG. 4 illustrates a table defining the encoding information for minutia of fingerprints according to the present application.
Figure 9:
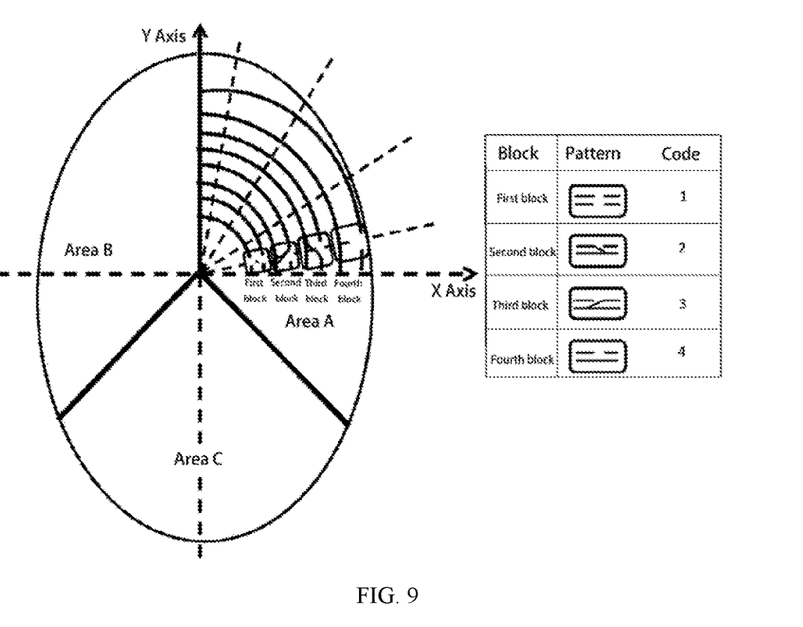
FIG. 9 illustrates a schematic diagram for forming encoding blocks according the present application.

FIG. 4 illustrates a table defining the encoding information for minutia of fingerprints. In the present application, minutia representing various encoding information including bifurcations, enclosures, bridges, short ridges, crossovers, dots, breaks, and so on, and various combinations thereof, are provided on at least one, usually two or three friction ridge lines, so as to form codes of fingerprints of things constituted by characters such as numbers and/or alphabets. A certain characteristic or certain characteristics of minutia can be mapped to or can be associated with a specific character (for example a number or an alphabet) or a string of characters. Characters can be selected or defined, and rules for mapping or associating can be set otherwise to those illustrated in FIG. 4. However, if codes of fingerprints of things are widely used, a generally-accepted encoding standard should be formed. The table showing rules for mapping as illustrated in FIG. 4 can usually be stored and called. The graphic data of these minutia are stored in the database in a graphic format regarding pixels corresponding to the size of encoding block as illustrated in FIG. 9 for facilitating an efficient and effective substitution.

A database for fingerprint template is used for storing fingerprint templates constituted by corresponding fingerprints. The fingerprint templates may be from images of human fingerprints of conventional types, or may be artificial fingerprint-like images. The fingerprint templates are generated through the processing based on conventional fingerprint images, and have, in addition to minutia used for positioning, at least part of area, that is, area for sequential encoding, in which all of friction ridge lines appear smooth and can be substituted, for example, with pixel images, so as to be added with minutia. Hereinafter, the method according to the present application will be further described with the following three exemplary fingerprint templates.

Figure 5:
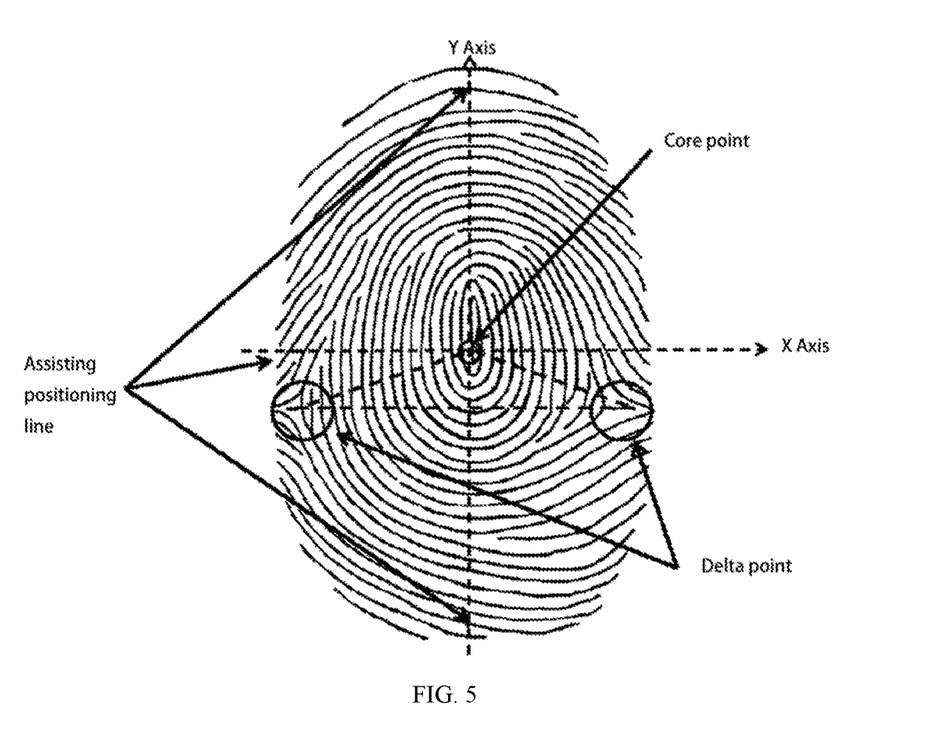
FIG. 5 illustrates a schematic diagram for a core-point-and-delta-point positioning fingerprint template according to the present application.
Figure 6:
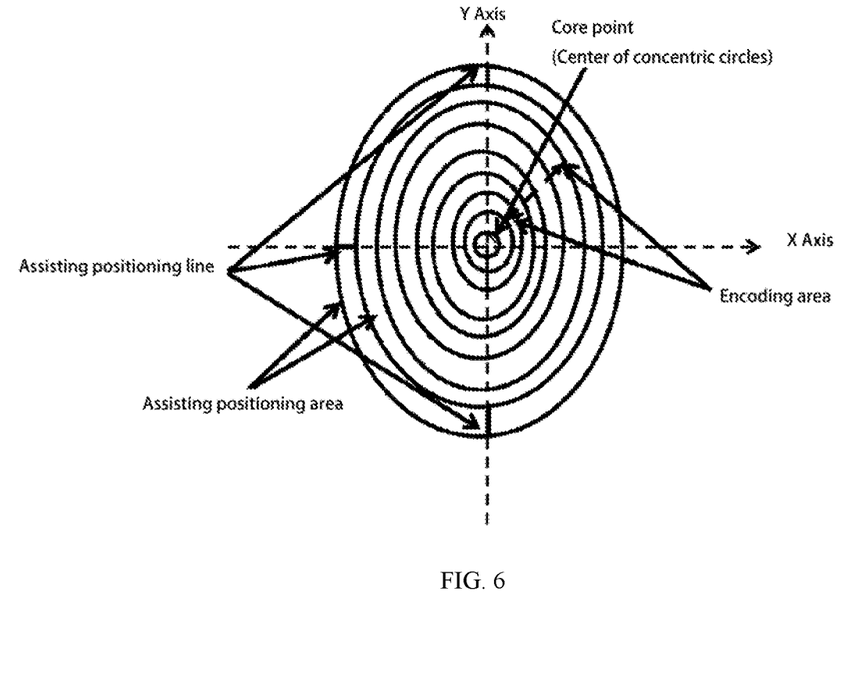
FIG. 6 illustrates a schematic diagram for a concentric circles assisting positioning fingerprint template according to the present application.
Figure 7:
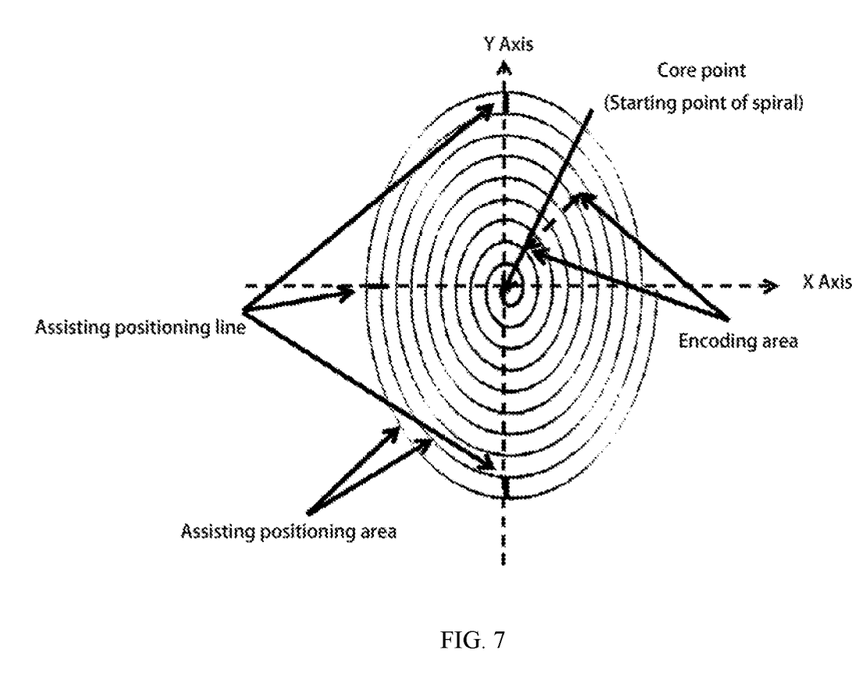
FIG. 7 illustrates a schematic diagram for a spiral assisting positioning fingerprint template according to the present application.

As illustrated in FIG. 5 to FIG. 7, the three exemplary fingerprint templates comprise a core-point-and-delta-point positioning fingerprint template, a concentric circles assisting positioning fingerprint template, and a spiral assisting positioning fingerprint template. Actually, the so-called concentric circles could be referred to as concentric ellipses more precisely, which match features of fingerprint more closely.

Figure 3:
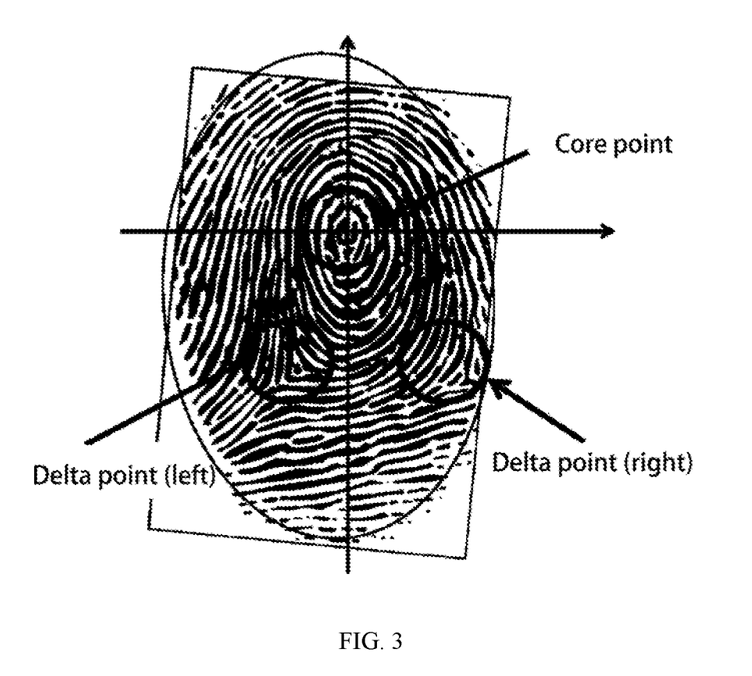
FIG. 3 illustrates a schematic diagram for a fingerprint image having a core point and delta points included in a human fingerprint.

As illustrated in FIG. 5, in said core-point-and-delta-point positioning fingerprint template, the pattern of fingerprint image appears a fingerprint-like image and comprises one core point and two delta points, i.e., a left-side delta point and a right-side delta point. Said core point is the center of the fingerprint image. Lines connecting the three points can form an isosceles triangle, and preferably an equilateral triangle. With the three points, a two-dimensional coordinate system for positioning fingerprint template can be built. A two-dimensional coordinate system can be built with the three points, and however, assisting positioning areas can also be provided in peripheral fingerprints to the fingerprint template. In the assisting positioning areas, assisting positioning marking points can be provided for assisting the building of coordinate system. The assisting positioning marking points can be specific minutia of fingerprints. In addition, delta points can be provided in a manner based on genuine human fingerprints, for example, the human fingerprint as illustrated in FIG. 3 in which a fingerprint image having a core point and delta points are included.

As can be clearly seen, a core point and two delta points are included in the core-point-and-delta-point positioning fingerprint template. A two-dimensional coordinate system can be built with the three points, and the positioning does not rely on any assisting positioning lines which, however, can used for checking the positioning. Such a dual-positioning method result in a more accurate building of coordinate system and also a more accurate positioning. The co-called assisting positioning line can actually be a specific minutia of fingerprint block. In a top right section of the fingerprint template exist no minutia of fingerprint to form encoding sections for performing encoding, while other areas can appear as a fingerprint image or any artificial fingerprint image.

As illustrated in FIG. 6, in said concentric circles assisting positioning fingerprint template, the pattern of the fingerprint image appears a fingerprint-like image, and specifically, concentric ellipses, and comprises a core point but no delta points. At least two, and usually two marking points are additionally provided. The core point is the center of concentric circles. The marking points are assisting positioning points for assisting the building of coordinate system which are provided in assisting positioning areas on the peripheral fingerprint to fingerprint template, and can be specific minutia of finger. The core point and the at least two marking points can be used for building a two-dimensional coordinate system. For example, one characteristic of finger, for example, a bridge or an enclosure, can be provided at any of the top, bottom, and left sides (i.e., a top point, a bottom point, and a left-side point) of the peripheral of the image of finger so as to be used as marking points in the coordinate system.

As illustrated in FIG. 7, said spiral assisting positioning fingerprint template resembles said concentric circles assisting positioning fingerprint template closely in all natures except that the image of finger of the spiral assisting positioning fingerprint template appears as an ellipse-like pattern constituted by a spiral. Specifically, except that in the spiral assisting positioning fingerprint template, a friction ridge line runs from a core point and spreads outward in a circular curve or spiral curve and so on so as to form a spiral, said spiral assisting positioning fingerprint template is identical to said concentric circles assisting positioning fingerprint template in the other natures, which will not be described herein. For these two templates, the building of coordinate system has to be dependent on assisting positioning areas.

As illustrated in FIG. 5, in a core-point-and-delta-point positioning fingerprint template, lines connecting the core point and the two delta points form an isosceles triangle or an equilateral triangle. Steps for building a two-dimensional coordinate system comprises: setting a core point as an origin; taking a line connecting a middle point of a connecting line of two delta points to the origin as Y Axis; and taking the connecting line of two delta points after translated toward the core point as X Axis, so as to build a two-dimensional coordinate system.

As illustrated in FIG. 6, for a concentric circles assisting positioning fingerprint template, steps for building a two-dimensional coordinate system with a core point and other three marking points comprises: taking a line connecting the core point with the top and bottom points as Y Axis; and taking a line connecting the core point to the left-side point as X Axis, so as to build a two-dimensional coordinate system. As illustrated in FIG. 7, steps for building a two-dimensional coordinate system in a spiral assisting positioning fingerprint template are identical to those in a concentric circles assisting positioning fingerprint template.

Figure 8:
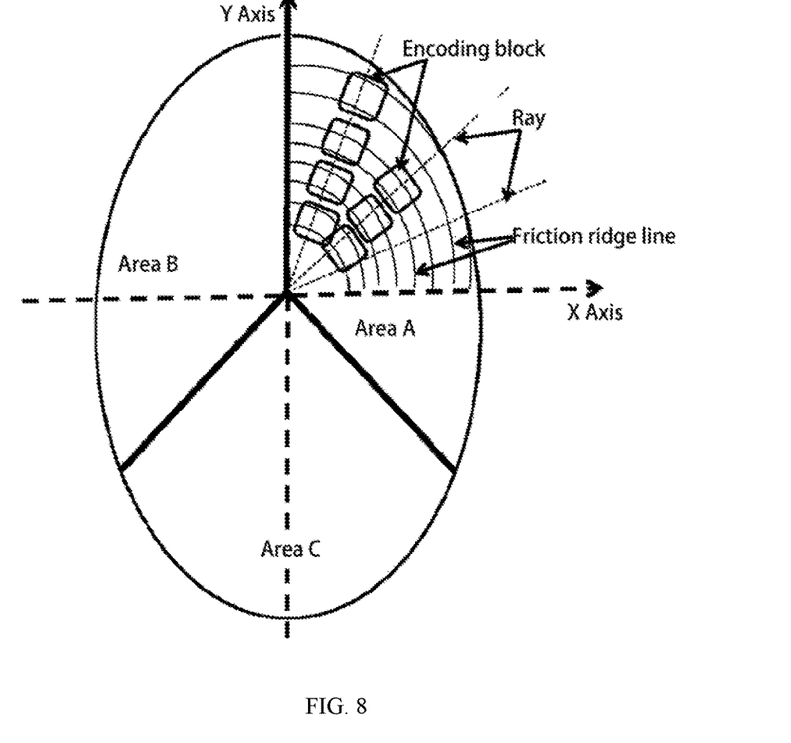
FIG. 8 illustrates a schematic diagram for forming coding sections according to the present application.

FIG. 8 illustrates a schematic diagram for forming coding sections according to the present application. As illustrated in FIG. 8, for a core-point-and-delta-point positioning fingerprint template as illustrated in FIG. 5, after the two-dimensional coordinate system is built in which angels formed by two lines connecting an origin to two delta points and Y Axis are 120° and −120° respectively, 18 rays are provided with each ray extending from the origin (i.e. the core point) as a vertex and with an angle between every two neighboring rays as 20°. One code corresponds to every two neighboring friction ridge lines, and thus 4 codes can be generated along one ray, as a result of which 72 codes in total will be generated.

Further, encoding sections are partitioned with fixed or variable sizes according to angles and/or distances to the origin based on determined position coordinate. The information for encoding is only provided in the corresponding encoding area so as to ensure a fast identification of and a significantly reduced scope for generating the information for encoding such that the encoding and generating can be quickened. Manners for encoding are not limited to that as illustrated in FIG. 8.

The information for encoding can also be encrypted through positioning encoding sections in coordinates. Specifically, various encoding sections are defined as encrypting sections or public sections. The sequence for storing and reading codes can be associated with a set of numbers which is referred as encoding keys, which are stored in the encrypting sections. As such, with different encoding keys, different images of fingerprints can be generated based on identical sets of information for encoding, and codes cannot be correctly decoded without the keys. Only authorized users can have the keys, and thus replicas of fingerprint codes can be prohibited.

As an instance, in a string of characters, for example, a barcode for cigarettes of a certain brand as 6901028075770, 690 stands for China. A string of numbers read from the public section is 9010280757706 which is obtained by moving the first digit, i.e., 6, of the original 6901028075770 to the last digit, and a barcode to which the string of numbers stands for a product which is not the cigarettes of the certain brand.

Keys stored in the encrypting sections can be a string of characters, such as, a string of numbers, and specifically, for example, 100, which is stored and read in a given sequence and represents the following encoding rule: moving a number at the last digit to the first digit of the string of characters of information bits. If a string of numbers of a key read from an encrypting section of fingerprint code is 100 and a string of numbers read from a public section is 9010280757706, then an actual fingerprint code as represented is not 9010280757706 but 0102807577069.

Similarly, a key of 101 represents an encoding rule of moving numbers at the last two digits to the first two digits. If a string of numbers read from a public section is still 9010280757706, then an actual code of fingerprint as represented is 0690102807577.

Encoding keys can be determined in advance by a user or users of fingerprint codes and a provider or providers of device for fingerprint codes.

FIG. 9 illustrates a schematic diagram for forming encoding blocks according the present application. As illustrated in FIG. 9, in a given encoding section, a certain number of rays are provided with each ray extending from the origin of the two-dimensional coordinate system as a vertex and with a certain angle between every two neighboring rays, and a number of encoding blocks are formed at intersections between rays and corresponding friction ridge lines of the fingerprint template. The encoding blocks may be pixel areas which are formed about the intersections and are substitutable with sizes identical to those of pixel images of the minutia of fingerprint and in the shape of rectangle, square or regular sector. At least one, for example, two or three, friction ridge lines are included in the encoding block. For four encoding blocks along a certain ray, numbers to which the first block to the fourth blocks correspond are 1234, and images of minutia of fingerprints as shown on the right side of FIG. 9 are used to substitute original images of minutia of fingerprints in corresponding encoding blocks, with which new images of minutia of fingerprints representing 1234 can be generated.

Figure 10:
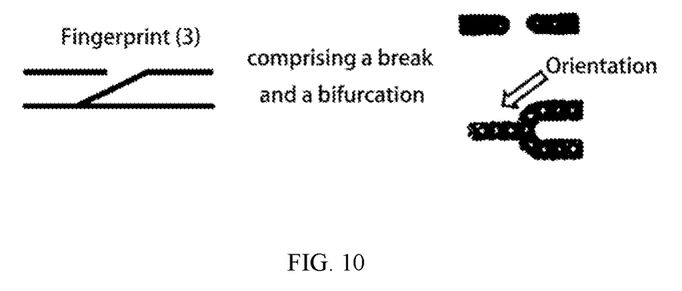
FIG. 10 illustrates a schematic diagram for a specific encoding method according to the present application.
Figure 11:
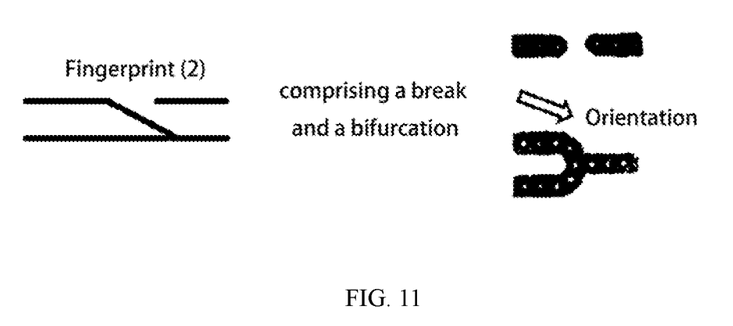
FIG. 11 illustrates a schematic diagram for a specific encoding method according to the present application.

With FIG. 10 and FIG. 11, taking fingerprint codes  and  as examples, the manner of generating finger codes with minutia of fingerprint and the effect of orientation on encoding will be described. Each of the two fingerprint codes is constituted by a break and a bifurcation. In the fingerprint image (2), one line of the bifurcation runs from the upper left to the lower right and then joins the other line; in contrast, in the fingerprint image (3), one line the bifurcation runs from the upper right to the lower left and then joins the other line. The fingerprint of thing of every product has a core point and two delta points; the core point is taken as the origin of two-dimensional coordinate system, and angels formed by two lines connecting the origin to the two delta points and Y Axis are 120° and −120° respectively, by which three evenly-partitioned areas (six subareas) A (A1, A2), B (B1, B2), C(C1, C2) are formed; 18 rays are provided with each ray extending from the origin as a vertex and with an angle between every two neighboring rays as 20°; one code corresponds to every two neighboring friction ridge lines, and thus 4 codes can be generated along one ray, as a result of which 72 codes in total will be generated, so as to encode a product into a fingerprint of thing. The quantity of encoding sections, quantity of rays, quantity of codes on each ray of can be set according to practical requirements, and those are described herein as examples and should not be construed as any limitations to the present application. Actually, the quantity, angles and so on of rays can also be set according to practical requirements.

4 codes on one ray can be constituted by at least one aforementioned minutia, and specifically:

as illustrated in FIG. 9, in a core-point-and-delta-point positioning fingerprint template, on a ray between which and X Axis an angle of +10° is formed, an encoding section at a distance of 8 to the origin and in a size of 6×5 is taken as a first encoding section referred to as a first section;

an encoding section at a distance of 12 to the origin and in a size of 6×5 is taken as a second encoding section referred to as a second section;

an encoding section at a distance of 16 to the origin and in a size of 6×5 is taken as a third encoding section referred to as a third section;

an encoding section at a distance of 20 to the origin and in a size of 6×5 is taken as a fourth encoding section referred to as a fourth section.

For a fingerprint template, when a fingerprint of thing is decoded, the identification of fingerprint template can be performed at first. That is, the type of template to which the fingerprint image to be decoded belongs is determined so as to build a corresponding coordinate system.

The encoding and identification procedure for fingerprints of things according to the present application comprises:

I. Encoding

To perform the encoding a string of numbers of 58 into a fingerprint of thing, a core-point-and-delta-point positioning fingerprint template is used, and then a two-dimensional coordinate system is built. Actually, the present application should not be limited to a two-dimensional coordinate system. Any other manners for enabling positioning fingerprint templates If the following is performed:

taking an encoding block on a ray between which and X Axis an angle of +10° is formed and at a distance of 8 to the origin and in a size of 6×5 as a first encoding block referred to as Area A in which a code of a number of 5 is stored;

taking an encoding block on a ray between which and X Axis an angle of +30° is formed and at a distance of 16 to the origin and in a size of 6×5 as a second encoding block referred to as Area B in which a code of a number of 8 is stored;

then steps as follows are taken:

Step 1: using a core-point-and-delta-point positioning fingerprint template in which a core point and two delta points have been set, and through the comparison of pixel images, determining an origin and two delta points and determining X Axis and Y Axis so as to build a two-dimensional coordinate system, and providing lays according to the aforementioned manner so as to form encoding blocks.

Step 2: according to the rules for mapping as illustrated in FIG. 4, an image of characteristic of fingerprint for a number of 5 is  in which the upper characteristic of fingerprint is a continuous friction ridge line and the lower characteristic of fingerprint is a break, and an image of characteristic of fingerprint for a number of 8 is  in which two friction ridge lines cross each other and thus a characteristic of fingerprint is a crossover.

Step 3: determining coordinates of Area A according to an angle of +10° about X Axis and a distance of 8 to the origin and substituting an image of Area A in the fingerprint template with  and similarly determining coordinates of Area B and substituting an image of Area B in the fingerprint template .

As such, images of minutia of fingerprint including numbers of 5 and 8 are generated, which can be referred to as images of fingerprint of thing of 58.

II. Decoding

Step 1: Determining Fingerprint Template

Figure 12:
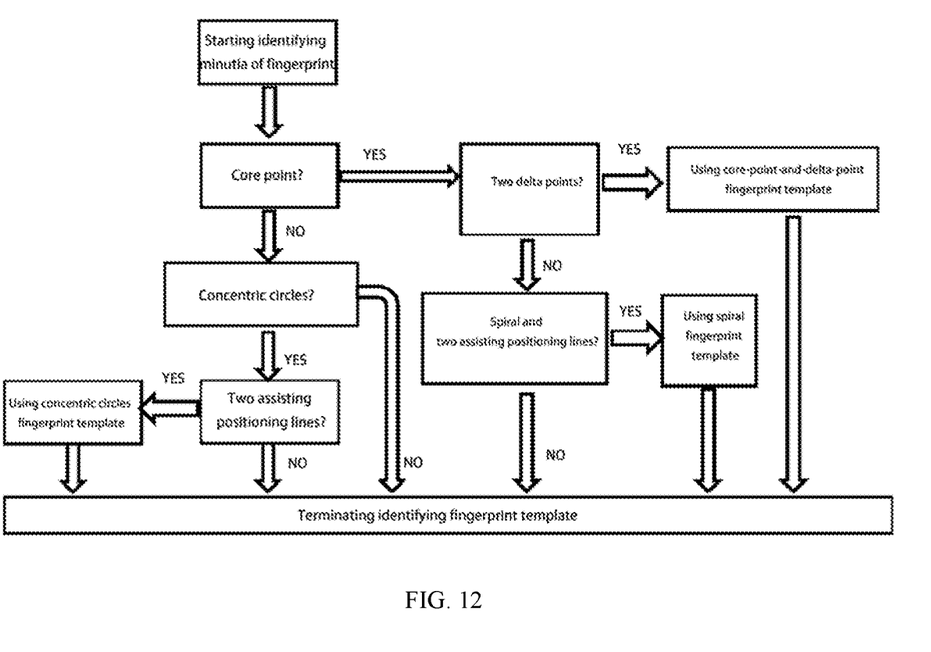
FIG. 12 illustrates a schematic flowchart for identifying the fingerprint of thing based on the fingerprint template according to the present application.

FIG. 12 illustrates a schematic flowchart for identifying the fingerprint of thing based on the fingerprint template according to the present application. With a computer image identifying device, the images of fingerprint of thing of 58 as generated are identified. Specifically, whether a core point exists is determined according to the identification of minutia; if a core point exists, then whether two delta points exist is determined; if two delta points exist, then a first fingerprint template (i.e., a core-point-and-delta-point positioning fingerprint template) is used. Of course, if otherwise, for example, conditions of other fingerprint templates are identified, then said other fingerprint templates are used. Assisting positioning lines in FIG. 12 are actually the aforementioned marking points for assisting positioning which can be specific minutia of fingerprint.

A center of the core point is set as an origin, a line connecting a middle point of a connecting line of centers of two delta points to the origin as Y Axis, and the connecting line of centers of two delta points after translated toward the core point as X Axis, so as to build a two-dimensional coordinate system.

Step 2: Identifying Encoding Sections

Based on the two-dimensional coordinate system as generated, determining a first encoding block A according to an angle of +10° about X Axis, a distance of 8 to the origin and a size of 6×5, an image of the block is read as , and encoding features in the block A are identified using the image identification as the upper friction ridge line being a continuous line and the lower friction ridge line being a break, and decoding the code of the block as a number of 5 according to the rules for mapping as illustrated in FIG. 4 using, for example, the comparison of pixel images; and similarly, decoding an image of a second encoding block B of  as a number of 8.

As such, the fingerprint of thing is identified as the information of 58.

A wholly new fingerprint of thing with a two-dimensional structure and an encoding method for the fingerprint of thing are provided in the present application. According to the present application, specific minutia of fingerprint are provided on images of fingerprint templates without any minutia of fingerprint through, for example, pixel substitution with minutia of fingerprint block, so as to generate an image of fingerprint including specific information, i.e., fingerprint of thing. Manners in which the combination of minutia of fingerprint represents the specific information, that is, specific manners for encoding one of keys of which lies in the provision of minutia of fingerprint on the fingerprint template, should not be restricted in the present application.

While various embodiments of the present application have been described above referring to the drawings, it should be understood that they have been presented by way of example only, and not limitation. It will be apparent to those skilled in the art that various changes, substitution and/or improvements in form and detail can be made therein without departing from the spirit and scope of the application.

What is claimed is:

1. An encoding method for a fingerprint of a thing, comprising:
   selecting from a database of fingerprint templates a fingerprint template which is an image of a fingerprint having a plurality of marking points;
   building a two-dimensional coordinate system, and based on the two-dimensional coordinate system, partitioning the fingerprint template into at least one encoding section;
   providing in the at least one encoding section a plurality of rays with each ray extending from an origin of the two-dimensional coordinate system as a vertex and with an angle between every two neighboring rays, and forming a plurality of encoding blocks at intersections between the rays and corresponding friction ridge lines of the fingerprint template; and
   selecting encoding blocks to be encoded according to the encoding information, and substituting each encoding block as selected with a pixel image of minutia of the fingerprint, so as to form an image of the fingerprint having the minutiae of the fingerprint including the encoding information.

2. The encoding method as claimed in claim 1, further comprising:
   associating the minutiae of the fingerprint with characters including alphabets and/or numbers so as to form a database defining the encoding information of the minutiae of the fingerprint.

3. The encoding method as claimed in claim 2, wherein the marking points comprise one core point and two delta points provided at fixed positions in the fingerprint template respectively or three specific minutia of the fingerprint at fixed positions on peripheral friction ridge lines of the fingerprint template.

4. The encoding method as claimed in claim 3, wherein the core point is a starting point, a terminating point, or a dot of a spiral friction ridge line.

5. The encoding method as claimed in claim 4, wherein lines connecting the core point and the two delta points form an isosceles triangle or an equilateral triangle.

6. The encoding method as claimed in claim 5, wherein the building of the two-dimensional coordinate system further comprises:
   setting the core point as an origin, taking a line connecting a middle point of a connecting line of the two delta points to the origin as a Y Axis, and taking the connecting line of the two delta points after translated toward the core point as an X Axis, so as to build the two-dimensional coordinate system.

7. The encoding method as claimed in claim 4, wherein for a fingerprint template without any delta points, the building of the two-dimensional coordinate system further comprises:
   setting the core point as an origin, rotating the image of the fingerprint such that the three marking points are located on the top, at the bottom and on the left, respectively, taking a line connecting the core point with a marking point on the top as a Y Axis, and taking a line connecting the core point to a marking point on the left as an X Axis, so as to build the two-dimensional coordinate system.

8. The encoding method as claimed in claim 1, wherein the encoding sections are formed by partitioning the image of the fingerprint according to angles and/or distances to the origin based on the two-dimensional coordinate system.

9. The encoding method as claimed in claim 1, wherein the encoding blocks are pixel areas formed about the intersections for substitution.

10. The encoding method as claimed in claim 9, wherein any of the encoding blocks are in the shape of rectangle, square, or regular sector.

11. The encoding method as claimed in claim 10, wherein at least one friction ridge line is included in any of the encoding blocks.

12. The encoding method as claimed in claim 11, wherein two or three friction ridge lines are included in any of the encoding blocks.

13. The encoding method as claimed in claim 1, wherein the encoding blocks are the same as the corresponding pixel images of minutiae of the fingerprint in size.

14. The encoding method as claimed in claim 13, wherein the pixel images of minutiae of the fingerprint include a core point, delta point, bifurcation, enclosure, bridge, crossover, break or dot.

15. The encoding method as claimed in claim 14, wherein the minutiae of the fingerprint can represent specific alphabets or numbers.

16. The encoding method as claimed in claim 15, wherein codes representing the specific information are formed according to alphabets or numbers which are represented by the minutiae of the fingerprint formed on the image of the fingerprint and coordinates or angles of the minutiae of the fingerprint.

17. The encoding method as claimed in claim 16, wherein any of the encoding sections are formed as a public section for storing a string of characters for the encoding information or an encrypting section for storing a key for the encoding information.

18. The encoding method as claimed in claim 17, wherein the key is a string of characters for describing a sequence for storing and/or reading the string of characters for the encoding information.

\* \* \* \* \*